(12) United States Patent
Ayukawa et al.

(10) Patent No.: US 11,598,694 B2
(45) Date of Patent: Mar. 7, 2023

(54) ABNORMALITY DIAGNOSIS SYSTEM FOR ROTARY ELECTRIC MACHINE

(71) Applicant: Hitachi Industrial Products, Ltd., Tokyo (JP)

(72) Inventors: Shuhei Ayukawa, Tokyo (JP); Yasushi Hayasaka, Tokyo (JP); Motonobu Iizuka, Tokyo (JP); Takeki Hara, Tokyo (JP); Masaaki Endo, Tokyo (JP); Atsushi Fukunaga, Tokyo (JP)

(73) Assignee: Hitachi Industrial Products, Ltd., Tokyo (JP)

( * ) Notice: Subject to any disclaimer, the term of this patent is extended or adjusted under 35 U.S.C. 154(b) by 126 days.

(21) Appl. No.: 17/419,964

(22) PCT Filed: Jan. 15, 2020

(86) PCT No.: PCT/JP2020/001020
§ 371 (c)(1),
(2) Date: Jun. 30, 2021

(87) PCT Pub. No.: WO2020/149292
PCT Pub. Date: Jul. 23, 2020

(65) Prior Publication Data
US 2022/0074814 A1    Mar. 10, 2022

(30) Foreign Application Priority Data
Jan. 18, 2019 (JP) .............................. JP2019-006724

(51) Int. Cl.
*G01M 13/045* (2019.01)
*H02K 11/21* (2016.01)
*H02P 3/06* (2006.01)

(52) U.S. Cl.
CPC ........... *G01M 13/045* (2013.01); *H02K 11/21* (2016.01); *H02P 3/06* (2013.01); *H02K 2213/03* (2013.01); *H02K 2213/06* (2013.01)

(58) Field of Classification Search
CPC . G01M 13/045; H02K 11/21; H02K 2213/03; H02K 2213/06; H02P 3/06
See application file for complete search history.

(56) References Cited

U.S. PATENT DOCUMENTS 11,269,322 B2 * 3/2022 Unuma .............. G05B 23/0283

FOREIGN PATENT DOCUMENTS

| JP | 56-58428 U | 5/1981 |
|----|------------|--------|
| JP | 56-81036 A | 7/1981 |

(Continued)

OTHER PUBLICATIONS

International Search Report (PCT/ISA/210) issued in PCT Application No. PCT/JP2020/001020 dated Mar. 10, 2020 with English translation (four (4) pages).

(Continued)

*Primary Examiner* — Aditya S Bhat
(74) *Attorney, Agent, or Firm* — Crowell & Moring LLP

(57) ABSTRACT

The present invention provides an abnormality diagnosis system capable of identifying an abnormality occurrence site in a rotary electric machine by use of output of sensors mounted to a bearing of the rotary electric machine. The abnormality diagnosis system includes: a rotary electric machine that has a main shaft secured to a center of a rotor and supported by a bearing; a vibration sensor that measures a vibration value of the bearing; a speed sensor that measures a rotational speed value of the main shaft; and an abnormality diagnosis apparatus that diagnoses abnormality in the rotary electric machine based on the vibration value and the rotational speed value. The abnormality diagnosis (Continued)

apparatus includes: a database that records the vibration value, the rotational speed value, and measurement times of the vibration value and the rotational speed value, as a data group of one unit, the vibration value and the rotational speed value measured within a predetermined time period; and an abnormality determination section that makes determination of abnormality, if a first threshold is exceeded by a difference in maximum vibration value in one speed range of interest between a past data group and a newer data group of a plurality of data groups recorded in the database, and makes no determination of abnormality, even if the first threshold is exceeded by a difference in maximum vibration value outside the speed range of interest.

9 Claims, 6 Drawing Sheets

(56) References Cited

FOREIGN PATENT DOCUMENTS

| | | |
|---|---|---|
| JP | 2007-10415 A | 1/2007 |
| JP | 2017-26421 A | 2/2017 |
| WO | WO 2017/145222 A1 | 8/2017 |

OTHER PUBLICATIONS

Japanese-language Written Opinion (PCT/ISA/237) issued in PCT Application No. PCT/JP2020/001020 dated Mar. 10, 2020 (three (3) pages).

* cited by examiner

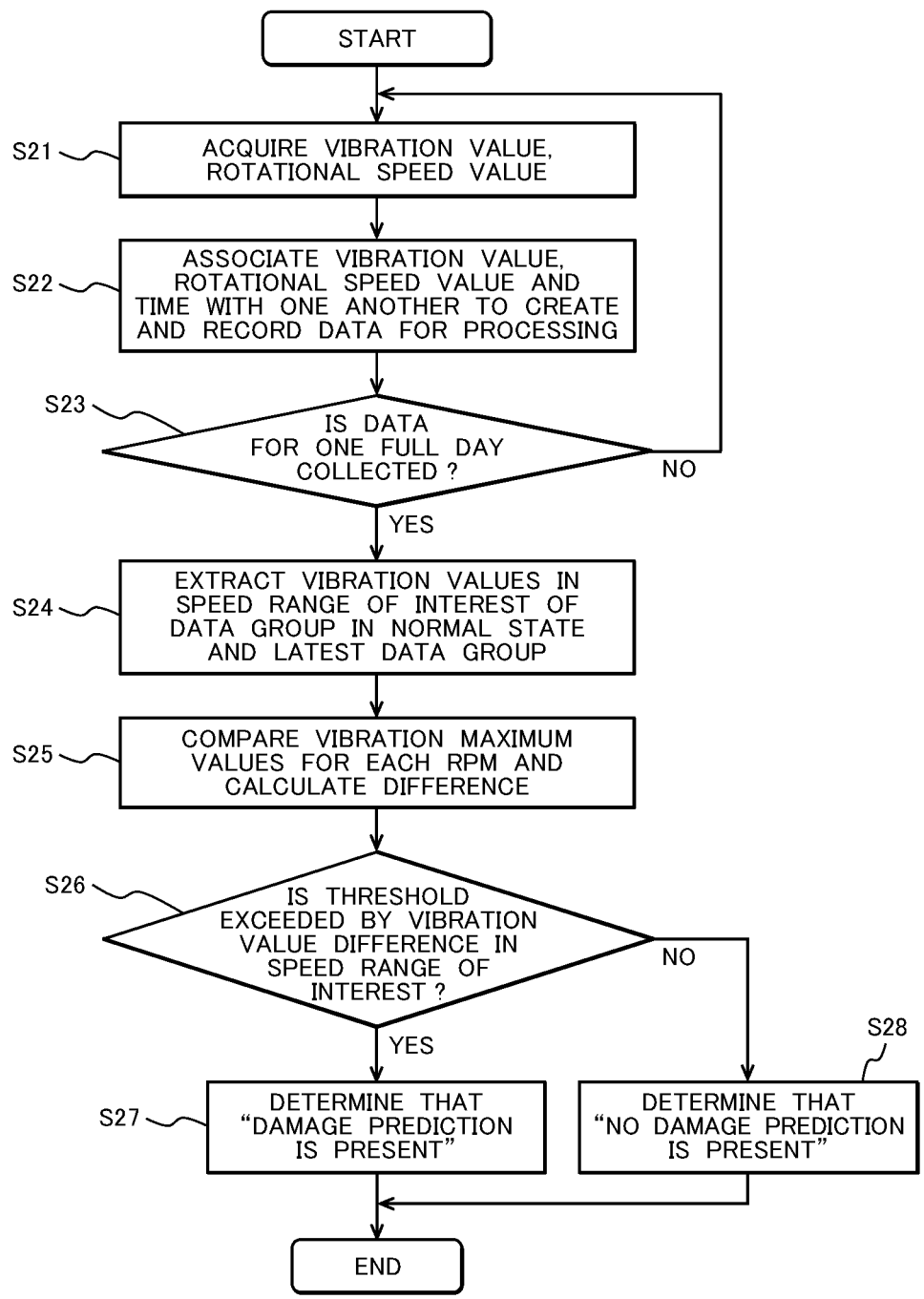

ABNORMALITY DIAGNOSIS SYSTEM FOR ROTARY ELECTRIC MACHINE

TECHNICAL FIELD

The present invention relates to an abnormality diagnosis system that diagnoses the presence or absence of prediction of damage to a rotary electric machine.

BACKGROUND ART

Some techniques such as disclosed in PTL 1 and PTL 2 are known as conventional diagnostics for rotary electric machines.

The abstract of PTL 1 discloses, "provide a bearing degradation diagnosis apparatus, a bearing degradation diagnosis method and a bearing degradation diagnosis system enabling high-accuracy diagnosis of degradation in a bearing, and also enabling degradation diagnosis while avoiding damage to a bearing and rotary equipment with the bearing, in which a bearing degradation diagnosis apparatus 1 includes an excitation control section (12, 6), a degradation determination section 14, and a vibration value DB 15. The excitation section (12, 6) excites a rotating shaft 4 or a bearing 2 or a support portion 26 of an electric motor 3 with a frequency band including a resonant frequency of a bearing 4, and controls the frequency of performing the excitation, the rotating shaft 4 transmitting the rotary drive power to a rotor 5 which is a driven element, the bearing 2 rotatably supporting the rotating shaft 4, the electric motor 3 having the rotating shaft 4. The vibration value DB 15 stores past vibration values of the bearing 4 in association with at least RPM of the electric motor 3. The degradation determination section 14 determines a derogation condition of the bearing 2 based on a measured vibration value of the bearing 2 under measurement and past vibration values stored in the vibration value DB 15."

Also, the abstract of PTL 2 discloses, "provide a bearing abnormality diagnosis system capable of speedily setting an appropriate diagnosis threshold value even if a rotary machine varies in RPM when diagnosis is performed", and that "a facility maintenance computer 17, which makes up part of a bearing abnormality diagnosis system 20, diagnoses abnormality in a bearing 13 by: receiving vibration data of the bearing 13 measured by an acceleration pickup 15; then calculating a representative value of the vibration data; and then, based on model data of the bearing 13 and the rotational speed information acquired from a PLC 3, reading a corresponding diagnosis threshold value from a database 19 to make comparison between the representative value and the diagnosis threshold value."

In short, the bearing degradation diagnosis apparatus disclosed in PTL 1 and the bearing abnormality diagnosis system disclosed in PTL 2 are both for diagnosis of degradation or abnormality in a bearing of a rotary electric machine.

Typically, a change in vibration when abnormality occurs during operation varies among bearings, because rotary electric machines differ in working conditions, installation environment, and abnormal state from one another. This causes a problem of low-accuracy diagnosis of abnormality.

To address this, in PTL 1, an excitation device mounted to a bearing component is appropriately controlled to measure a resonant frequency of the bearing component in advance. Then, a value obtained by an acceleration sensor during operation undergoes a Fourier transform to determine a signal strength corresponding to the frequency. Then, the signal strength at the resonant frequency is compared with past data for abnormality diagnosis. It is described that the method enables high-accuracy diagnosis of degradation in a bearing and enables a degradation diagnosis to be made while avoiding damage in the bearing and the rotary equipment with the bearing when the resonant frequency is acquired.

Also, in the description of PTL 2, even if the rotary machine varies in RPM, the bearing abnormality diagnosis apparatus capable of speedily setting an appropriate diagnosis threshold value is used to improve the work efficiency of bearing abnormality diagnosis and also to improve the diagnostic accuracy.

CITATION LIST

Patent Literature

PTL 1: PCT International Application Publication No. WO2017/145222
PTL 2: Japanese Patent Application Laid-Open No. 2007-10415

SUMMARY OF INVENTION

Technical Problem

In PTL 1 and PTL 2, the accuracy of diagnosis of abnormality in the bearing of the rotary electric machine is increased by the above methods. However, consideration is not given to diagnosis of abnormality in another site (e.g., a rotation element such as a main shaft supported on a bearing, and the like) of the rotary electric machine. Because of this, where any anomaly is detected, even if no abnormality occur in the bearing in reality and abnormality occurs in another site (e.g., the main shaft and/or the like), there is a risk of incorrect determination that abnormality occurs in the bearing.

It is accordingly an object of the present invention to provide an abnormality diagnosis system capable of identifying an abnormality occurrence site of a rotary electric machine by use of output of a sensor mounted to a bearing of the rotary electric machine.

Solution to Problem

An abnormality diagnosis system includes: a rotary electric machine that has a main shaft secured to a center of a rotor and supported by a bearing; a vibration sensor that measures a vibration value of the bearing; a speed sensor that measures a rotational speed value of the main shaft; and an abnormality diagnosis apparatus that diagnoses abnormality in the rotary electric machine based on the vibration value and the rotational speed value. The abnormality diagnosis apparatus includes: a database that records the vibration value, the rotational speed value, and measurement times of the vibration value and the rotational speed value, as a data group of one unit, the vibration value and the rotational speed value measured within a predetermined time period; and an abnormality determination section that makes determination of abnormality, if a first threshold is exceeded by a difference in maximum vibration value in at least one speed range of interest between a past data group and a newer data group of a plurality of data groups recorded in the database, and makes no determination of abnormality even if the first threshold is exceeded by a difference in maximum vibration value outside the speed range of interest.

Advantageous Effects of Invention

According to the present invention, an abnormality diagnosis system capable of identifying an abnormality occurrence site in a rotary electric machine is provided.

BRIEF DESCRIPTION OF DRAWINGS

FIG. 4 is a flowchart of processing in an abnormality determination section.

DESCRIPTION OF EMBODIMENTS

An abnormality diagnosis system according to examples of the present invention will now be described with reference to the accompanying drawings.

Example 1

An abnormality diagnosis system 100 according to Example 1 of the present invention will be described with reference to FIG. 1 to FIG. 5.

Figure 1:
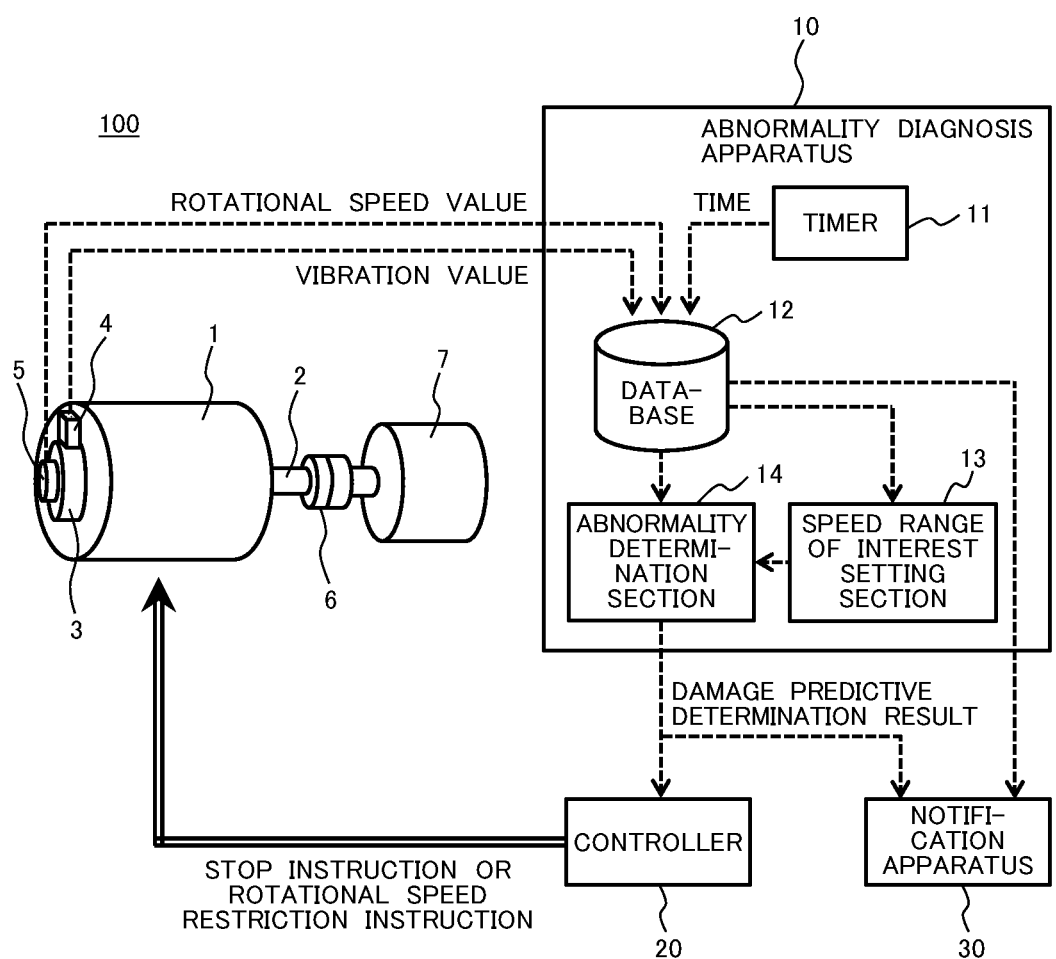
FIG. 1 is an example configuration of an abnormality diagnosis system according to Example 1.

FIG. 1 is an example configuration of the abnormality diagnosis system 100 according to the example. As illustrated in FIG. 1, the abnormality diagnosis system 100 includes a rotary electric machine 1, an abnormality diagnosis apparatus 10, a controller 20, and a notification apparatus 30. It is noted that an example configuration where the abnormality diagnosis apparatus 10 and the controller 20 are individually installed is described below, but both of them may be configured as a single piece.

The rotary electric machine 1 includes an approximately cylindrical housing, a stator disposed on the radial outer side within the housing, a rotor rotatably supported on the radial inner side of the stator, a main shaft 2 secured to the center of the rotor, and a bearing 3 rotatably supporting the main shaft 2. Also, the bearing 3 of the rotary electric machine 1 is mounted with a vibration sensor 4 and a speed sensor 5. The vibration sensor 4 measures a vibration value (vibration displacement, vibration speed, or vibration acceleration) when the bearing 3 vibrates. The speed sensor 5 measures a rotational speed value of the main shaft 2.

The rotary electric machine 1 is connected to rotary equipment 7 via a coupling 6 which transmits rotary power. Where the rotary electric machine 1 is a prime motor, the rotary equipment 7 serves as a driven element (a generator or the like). Alternatively, where the rotary electric machine 1 is a driven element (a generator or the like), the rotary equipment 7 serves as a prime motor. The description is given below of a case where the rotary electric machine 1 is a prime motor.

The abnormality diagnosis apparatus 10 acquires measurement values from the vibration sensor 4 and the speed sensor 5 to perform damage predictive diagnosis on the main shaft 2, the bearing 3, and the like. The abnormality diagnosis apparatus 10 includes a timer 11, a database 12, a speed range of interest setting section 13, and an abnormality determination section 14. It is noted that, in actuality, the abnormality diagnosis apparatus 10 is a calculating machine including a computing device such as CPU and/or the like, a main storage device such as semiconductor memory and/or the like, an auxiliary storage device such as a hard disc and/or the like, and hardware such as a communication device and/or the like. The database 12 recorded in the auxiliary storage device is referred, while the computing device executes programs loaded in the main storage device, thereby implementing the functions of the speed range of interest setting section 13, the abnormality determination section 14, and the like. However, such well-known technology may not be described as appropriate in the following description.

In the database 12 of the abnormality diagnosis apparatus 10, the vibration values measured by the vibration sensor 4 and the rotational speed values measured by the speed sensor 5, as well as times at which the measurements are made, are accumulated. The speed range of interest setting section 13 (operation will be detailed later) sets a predetermined rotational speed range (hereinafter referred to as an "speed range of interest"), and the abnormality determination section 14 (operation will be detailed later) makes abnormality determination based on a vibration value in the speed range of interest. A result of the abnormality determination of the abnormality diagnosis apparatus 10 is transmitted to the controller 20 and the notification apparatus 30 as a damage predictive determination result.

The controller 20 controls the driving of the rotary electric machine 1. When the abnormality diagnosis apparatus 10 detects a damage prediction, the controller 20 promptly brings the rotary electric machine 1 to an emergency stop or causes the rotary electric machine 1 to enter a restriction operation to slow down the rotational speed in stages. Also, the notification apparatus 30 notifies an administrator of results of observation and damage predictive determination which are performed on the rotary electric machine 1 by the abnormality diagnosis apparatus 10. When the abnormality diagnosis apparatus 10 detects a damage prediction, the administrator is notified that a damage prediction has been detected, and/or notified of the necessity for checkups and/or component replacement of the rotary electric machine 1. As methods of notifying the administrator, the administrator may be notified visually or audibly via a monitor or speaker of the notification apparatus 30 or may be notified via e-mail transmitted thereto.

In this manner, the abnormality diagnosis system 100 according to the example is capable of indirectly diagnosing prediction of damage to the rotary electric machine 1 using the vibration sensor 4 and the speed sensor 5 which are mounted to the bearing 3. This enables the administrator to make determination of the necessity or unnecessity of component replacement and/or overhaul before damage occurs to the main shaft 2 and/or the bearing 3. Each processing and each component of the abnormality diagnosis system 100 according to the example will now be described in order in detail.

<Processing to Set Interesting Speed Range>

Figure 2:
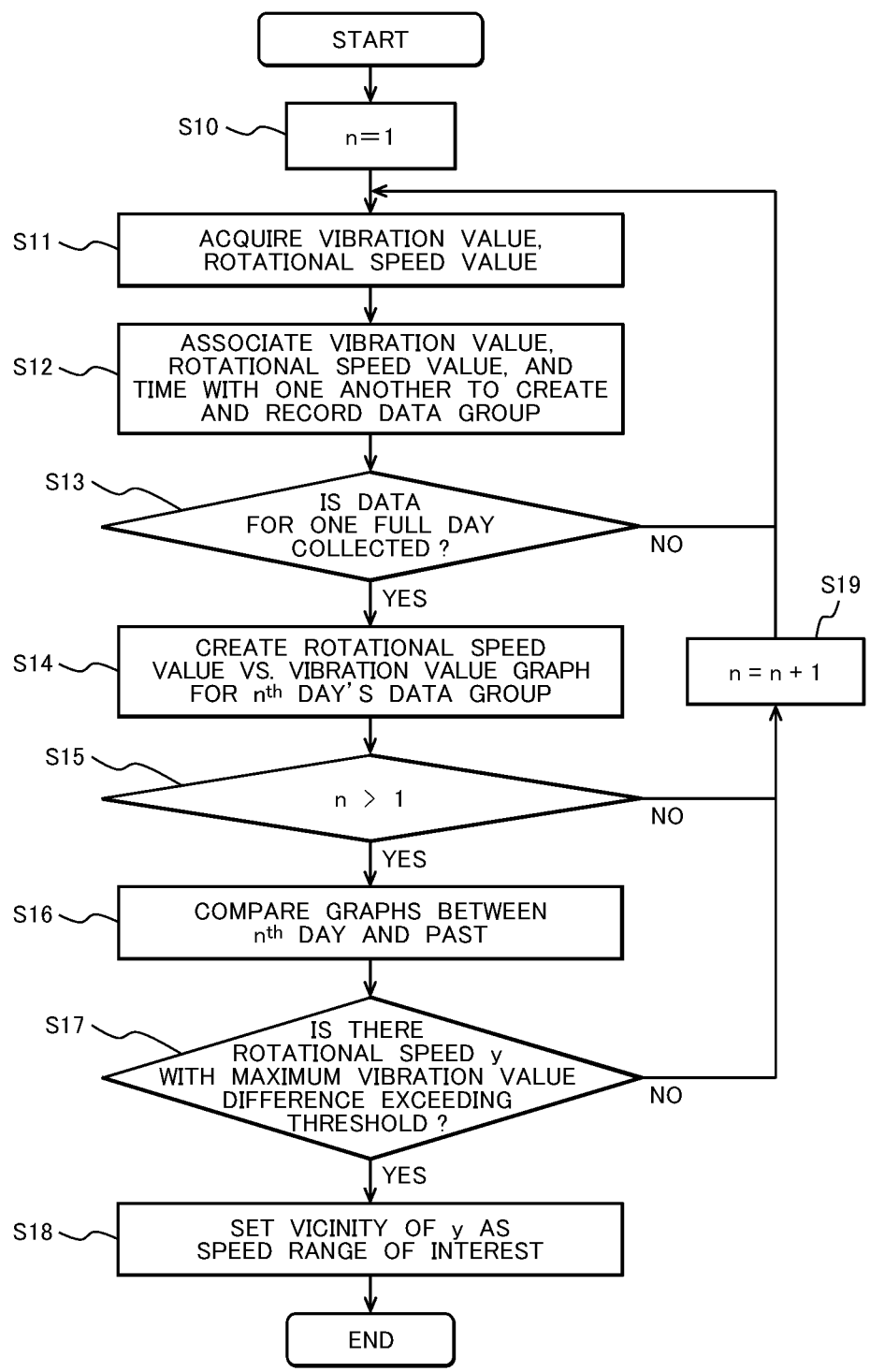
FIG. 2 is a flowchart of processing in a speed range of interest setting section.

FIG. 2 illustrates a processing flowchart for the speed range of interest setting processing performed mainly by the speed range of interest setting section 13.

As described later, in the example, time-series measurement values per day are handled as a data group of one unit. On this account, at S10, a variable n representative of how many days from the first day is set at one such that a data group on measurements made at a start date for operation of the rotary electric machine 1 is identified as the data group of the first day.

Then, at S11, a vibration value from the vibration sensor 4 and a rotational speed value from the speed sensor 5 are acquired. At S12, the acquired measurement values are recorded in the database 12 as a data group for use in diagnosis processing with the measurement values associated with measurement times obtained from the timer 11. At S13, it is determined whether data for one full day is collected. If the data for the full day is collected, the process proceeds to S14, whereas if it is not collected, the process returns to S11. Thus, the processing in S11, S12 is repeated until the data for the full day is collected.

Figure 3A:
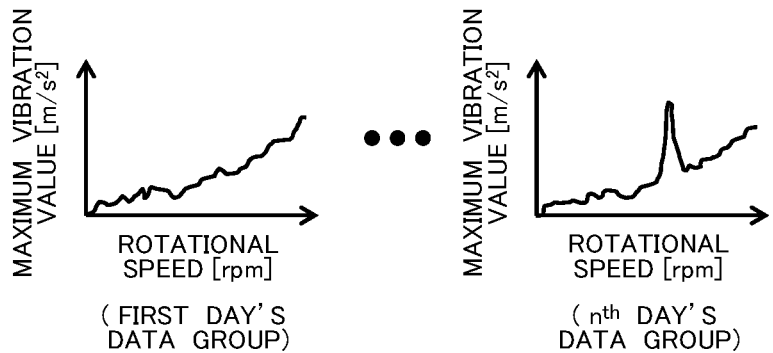
FIG. 3A is an example of graphs corresponding to a data group per day.

When the data for the full day is collected, at S14, a rotational speed value vs. maximum vibration value graph is created for the complete data group of a $n^{th}$ day. The graph shows a maximum value of the vibration values at each rotational speed, as illustrated in FIG. 3A by way of example. In FIG. 3A, only graphs of the first day and the $n^{th}$ day are shown, but actually graphs for the second day to the n-$1^{th}$ day omitted herein are also created. In this manner, the speed range of interest setting section 13 creates graphs for diagnosis processing on a daily basis.

It is noted that if the data group for diagnosis processing is collected with respect to longer one of sampling periods of the vibration sensor 4 and the speed sensor 5, the most thorough data can be obtained. However, if the data is used for later-mentioned processing, vast quantities of data will be used in calculations, and thus the length of processing time will be increased to lead to loss of real time properties. Therefore, the data provided by the vibration sensor 4 and the speed sensor 5 is preferably downsampled for an appropriate period of time. For example, the maximum values and the mean values per second of data output from the vibration sensor 4 and the speed sensor 5 may be determined and associated with each other. Using the mean value enables suppression of the influence of noise of sensor data.

Also, a period of time as a division to collect the data for diagnosis processing is merely exemplary, and the user may set any period of time rather than on a day-to-day basis. For example, where the data for diagnosis processing is collected on a half day-to-half day basis, many data groups for diagnosis processing can be acquired in a short period of time, but a distribution tendency of diagnosis processing data sets is difficult to be captured because of a smaller number of diagnosis processing data sets making up the data group for diagnosis processing. On the other hand, where a division is a longer period of time of two or more days, the number of diagnosis processing data sets making up the data group for diagnosis processing is increased so that the distribution tendency is easy to be captured. However, much time is required until data groups for diagnosis processing are sufficiently acquired. Also, where the rotary electric machine and the system with the rotary electric machine are operated in a specified cycle every other day, for example, where they are operated in the daytime and stopped in the nighttime, the division period of time is preferably set in accordance with the cycle.

At S15, it is determined whether the variable n is greater than one, that is, whether a past data group/past data groups exists. If the latest data group is a first day's data group and there is no past data group, the process proceeds to S19 to increment the variable n by one, and then the process returns to S11 to start collection of the following day's data group. On the other hand, if the latest data group is not the first day's data group and the past data group(s) exists, the process proceeds to S16.

At S16, the past graphs and the latest graph (graph of $n^{th}$ day) are compared. As a concrete example of this, an example of comparison of graphs between the first day and an $n^{th}$ day is described with reference to FIGS. 3B and 3C.

Figure 3B:
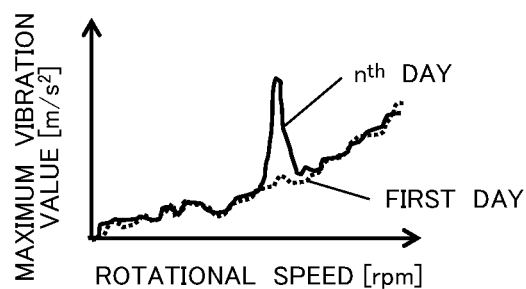
FIG. 3B is an example of display of a superimposing of graphs of a first day and an $n^{th}$ day on one another.
Figure 3C:
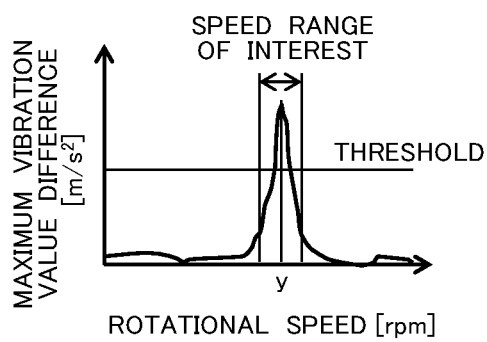
FIG. 3C is an example of setting a speed range of interest.

FIG. 3B shows display of a superimposing of graphs of the first day (dotted line) and the $n^{th}$ day (solid line) on one another. Also, FIG. 3C shows display of a difference in maximum vibration value between both the graphs. As illustrated in both the figures, as long as after a plurality of data groups are recorded in the database 12, the speed range of interest setting section 13 is able to perform a subtraction between the maximum vibration values of two graphs to obtain a difference. It is noted that, in FIGS. 3B and 3C, a comparison of graphs is made between the latest data group of an $n^{th}$ day and the data group of the first day acquired immediately after the start of operation of the rotary electric machine 1, but a method of selecting data groups and the number of data groups to be selected may be arbitrarily set by the user. For example, random selection from past data groups enables identification of a speed range of interest which will be described later, even when vibration value gradually increases. Also, the larger the amount of data to be compared, the higher the validity of a speed range of interest, but storing the data groups for comparison compresses the capacity of the database 12. Therefore, where the comparison of vibration values in S16 is concerned, the order of several tens of data groups for diagnosis processing is preferably selected randomly for use.

Then, at S17, the speed range of interest setting section 13 determines whether a rotational speed y with a maximum vibration value difference exceeding a predetermined threshold exists. Then, if the difference exceeds the threshold, the process proceeds to S18 where a range around a peak value of the rotational speed y is set as a speed range of interest in the abnormality diagnosis (see FIG. 3C). At this time, the administrator desirably checks up the rotary electric machine 1 to identify an abnormal site. If a correspondence between the speed range of interest and the abnormal site is identified here, the abnormal site can be identified when the abnormality determination section 14 described later detects abnormality.

It is noted that magnitude of the threshold and a width of the speed range of interest as illustrated in FIG. 3C may be arbitrarily set by the user. The higher the threshold, the more reliable the speed range of interest can be set. However, if the variation in peak value of the vibration values is not great before and after failure, the interest speed range may possibly be overlooked. Also, if the speed range of interest is narrow, the amount of data used in calculation can be reduced to minimize data load in the damage predictive diagnosis operation after the speed range of interest is determined. However, this may increase the possibility of overlooking damage prediction during operation outside the speed range of interest. Therefore, the width of the speed range of interest preferably has a value ranging from about 5% to about 10% of the rotational speed during rated operation of the rotary electric machine 1. It is noted that when the difference does not exceed the threshold, that is, when it is determined that there is no abnormality and no speed range of interest is identified, the process proceeds to S19 to increment the variable n by one, and then the process returns to S11 to start collection of the following day's data group.

Also, the validity of the speed range of interest can be evaluated by previously obtaining a natural frequency of vibration of the family of rotary electric machines 1. Because the rotary electric machine 1 has a tendency to increase vibrations during operation in the vicinity of the nature frequency of vibration, it is likely that damage occurs to a rotating part such as the main shaft 2 and the like. To address this, a speed range of interest including the nature frequency of vibration may be defined as a crucial, caution needed monitored range.

Also, the same as the speed range of interest set by the speed range of interest setting section 13 can be applied to another rotary electric machine with the same specifications. Because of this, for example, in the case of a mass-produced rotary electric machine 1, only when the specifications of the first installed machine are changed, a detection of a speed range of interest is simply needed. Also, it is possible to set a plurality of speed ranges of interest depending on changes in time series trend of the data group for diagnosis processing.

<Abnormality Determination Processing>

FIG. 4 illustrates a processing flowchart of the abnormality determination processing executed mainly by the abnormality determination section 14 after the speed range of interest is set (i.e., on or after the day following the $n^{th}$ day on which the speed range of interest is set). The abnormality determination section 14 uses, in the processing, a latest daily data group in the speed range of interest. It is noted that the daily data group is provided as an example, and a size of the data group may be arbitrarily designated by the user.

Initially, at S21, a vibration value is acquired from the vibration sensor 4 and a rotational speed value is acquired from the speed sensor 5. At S22, the measurement values are associated with measurement times and recoded in the database 12 as a data group for diagnosis processing. At S23, it is determined whether data for a full day is collected. That is, the processing steps in S21, S22 are repeated until the data for the full day is collected.

When the data for the full day is collected, at S24, the abnormality determination section 14 extracts speed range of interest data in the latest data group and the data group in the normal state. For example, the speed range of interest data group of the first day which is the start date for operation of the rotary electric machine 1 is used as a normal data group used for comparison.

At S25, a difference in maximum vibration value between the interesting speed rages extracted in S24 is calculated. Then, based on whether the difference is at or above the threshold, it is determined whether the maximum vibration value in the speed range of interest in the latest data group is equal to or greater than m times the maximum vibration value in the speed range of interest in the data group selected as the normal state (S26). If it is equal to or greater than m times, it is determined that damage prediction in the rotary electric machine 1 exists (S27). On the other hand, if the maximum vibration value is less than m times, it is determined that no damage prediction in the rotary electric machine 1 exists (S28). Here, since the monitoring target in S26 is limited to the difference in maximum vibration value between the speed ranges of interest, the amount of computation required to make abnormality determination is significantly reduced. In addition to that, even if the difference of the maximum vibration values outside the speed ranges of interest is large, such noise is so negligible that a misdiagnosis can be avoided. It is noted that, where a correspondence between a speed range of interest and an abnormal site has been identified, an abnormal site (e.g., the main shaft 2 or the bearing 3) may be identified in S27.

Here, the value of m may be arbitrarily set by the user. If m is set to a low value of two or less, the occurrences where damage is overlooked are reduced instead of an increase of the occurrences of error damage detection. On the other hand, if the value of m is set to a value higher than two, a high reliable result of damage prediction is reached, but damage may be overlooked.

Also, when the determination result by the abnormality determination section 14 takes into account a cumulative operating time of the rotary electric machine 1, a higher reliable result of damage prediction is reached. The rotary electric machine 1 after the passage of time following the start date of operation is more likely to cause abnormality in a rotating part such as the main shaft 2, the bearing 3, and the like than the rotary electric machine 1 immediately after the start of operation. Therefore, when cumulative operating time is increased, the m value defining the threshold of the abnormality determination section 14 is lowered to achieve increased reliability of damage predication diagnosis. Also, it is preferable to take measures against some of the abnormality diagnosis results made by the abnormality determination section 14, such as a strategy of performing replacement of the main shaft 2 and/or the bearing 3 exceeding several tens of thousands of hours in cumulative operating time.

<Notification Apparatus 30>

Figure 5:
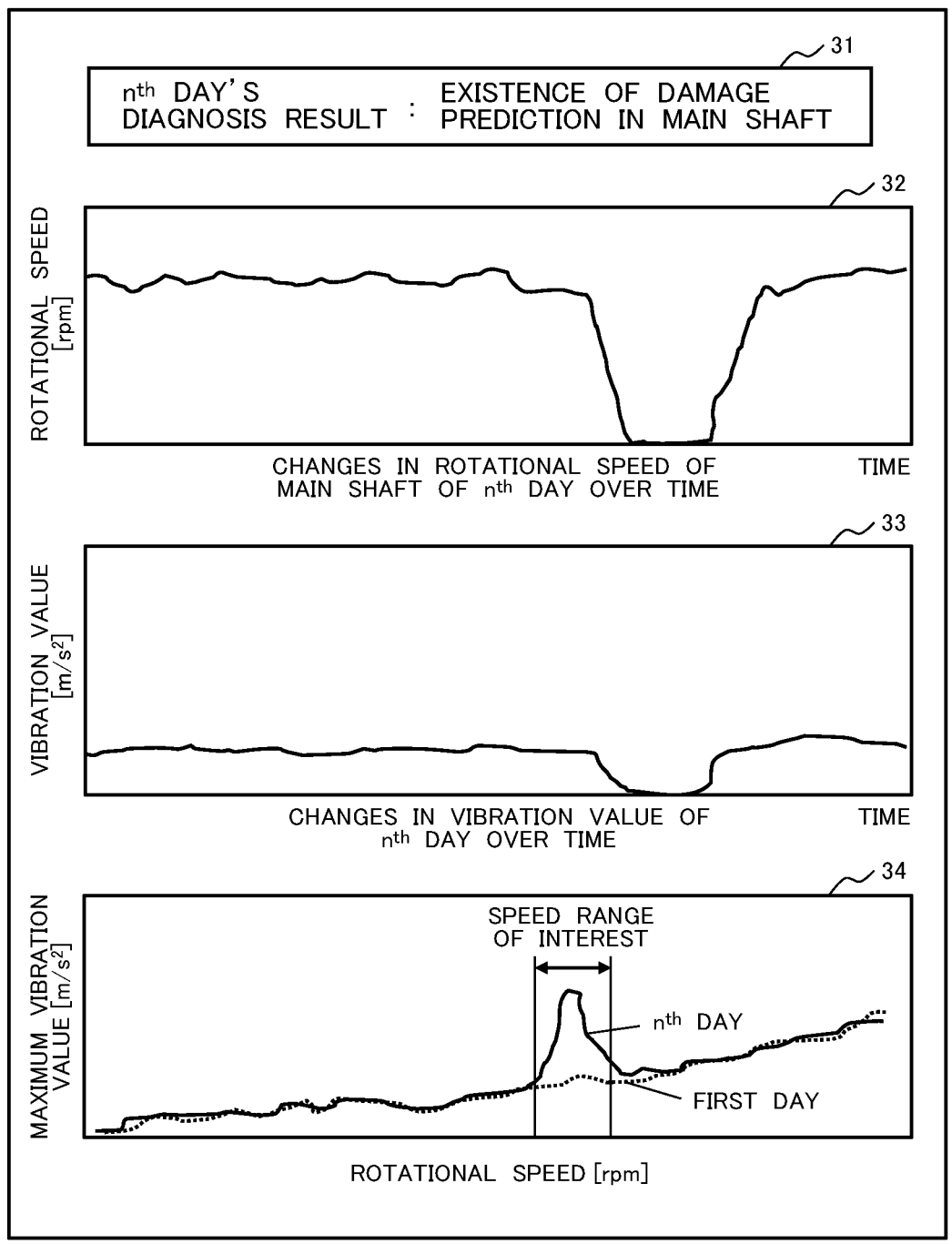
FIG. 5 is an example display on a monitor of a notification apparatus.

FIG. 5 shows an example of display screens of the monitor included in the notification apparatus 30. The example is an example display screen generated when damage prediction in the rotary electric machine 1 is detected based on a data group collected on an $x^{th}$ day. The display screen includes a diagnosis result box 31 to display "$x^{th}$ day's diagnosis result: existence of damage prediction in main shaft" which is a predictive diagnosis result achieved by the abnormality diagnosis apparatus 10, and also includes arrangement of graph boxes 32 to 34 respectively displaying changes in rotational speed of the main shaft over time, changes in vibration acceleration over time, and a graph used for diagnosis processing (display of a superimposing of the speed range of interest in FIG. 3C upon the graph in FIG. 3B), thus enabling improvement in viewability when the administrator wants to check occurrence situation of damage.

With the above-described abnormality diagnosis system according to the example, a speed range of interest is set first, and then whether the presence or absence of prediction of damage to a rotary electric machine is determined based on a difference in maximum vibration value in the speed range of interest between a normal state and a current state. Because of this, a misdiagnosis is not caused by noise outside the speed range of interest, so that more correct detection of damage prediction than before is enabled. Also, the relationship between a speed range of interest and an abnormal site is identified, so that when an abnormality is detected, the abnormal site is able to be identified.

Example 2

Figure 6:
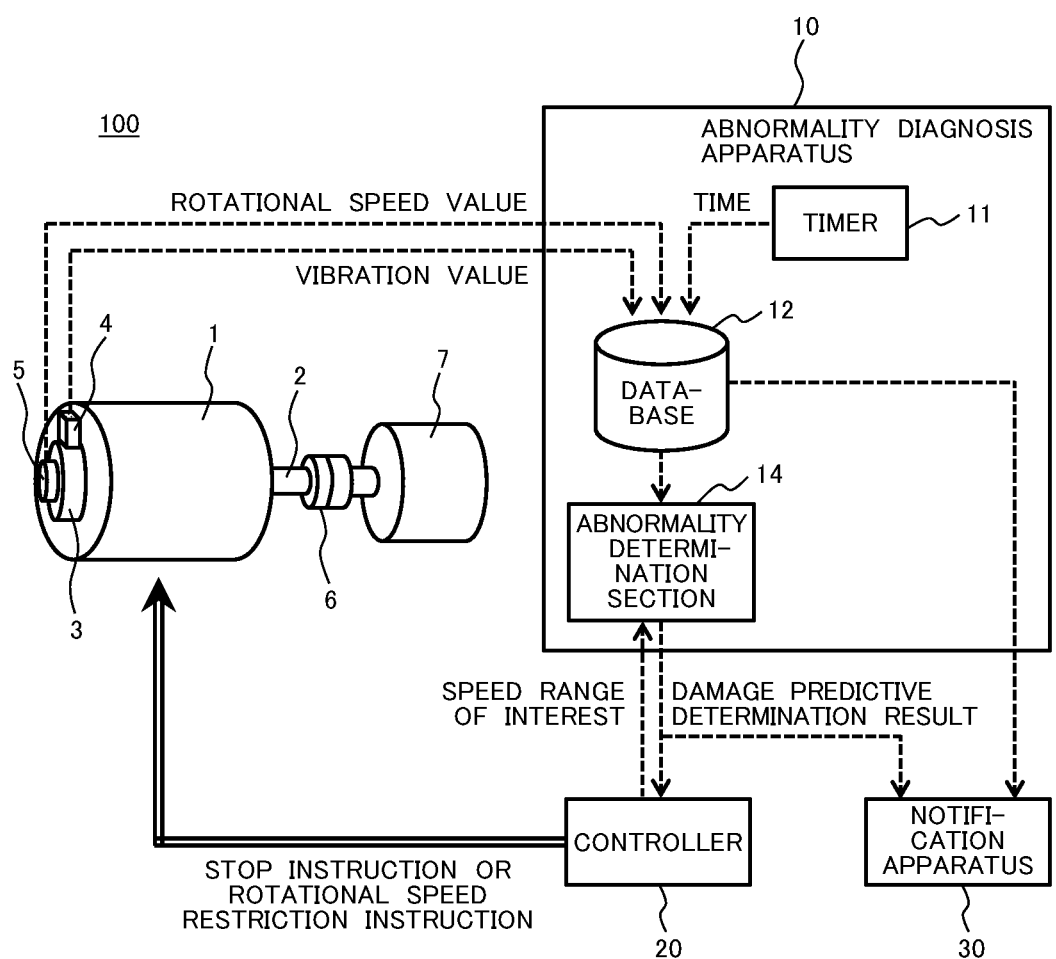
FIG. 6 is an example configuration of an abnormality diagnosis system according to Example 2.

An abnormality diagnosis system 100 according to Example 2 of the present invention will now be described with reference to FIG. 6. It is noted that commonalities with Example 1 are not described to avoid duplication.

In Example 1, in order to make abnormality determination even when the rotary electric machine 1 with unknown characteristics is a monitoring target, after the speed range of interest setting section 13 identifies an speed range of interest based on measurement values of the sensors, the abnormality determination section 14 makes determination as to the presence or absence of damage prediction based on a difference in maximum vibration value in the speed range of interest set by the speed range of interest setting section 13. In contrast with this, in the abnormality diagnosis system 100 according to the example illustrated in FIG. 6, the rotary electric machine 1 with known characteristics is a monitoring target, so that the speed range of interest setting section 13 is omitted and the abnormality determination section 14 makes determination as to the presence or absence of a damage prediction based on a difference in maximum vibration value in a speed range of interest preset by the administrator.

For example, when the characteristics of the rotary electric machine 1 are known so that damage prediction in the main shaft 2 can be diagnosed from a maximum vibration value around 40% of the rotational speed during rated operation, a damage prediction in the bearing 3 can be diagnosed from a maximum vibration value around 70%, and the like, the administrator pre-resisters two ranges around 40% and around 70% of the rotational speed during rated operation, as speed ranges of interest in the abnormality determination section 14 via the controller 20 and/or the like. In this case, the abnormality diagnosis apparatus 10 causes, via the controller 20, the rotary electric machine 1 to perform intensive operation at around 40% and around 70% of the rotational speed during rated operation, in order that the data groups required for the predictive diagnosis of damage to the main shaft 2 and the bearing 3 can be collected in a short time. And, for example, if determination that damage prediction exists is made based on the difference in the maximum vibration value in the speed range of interest around 40% of the rotational speed during rated operation, the abnormality diagnosis apparatus 10 can identify the main shaft 2 as exhibiting the damage prediction.

If damage to a certain site of the rotary electric machine 1 develops as abnormal vibration values in multiple speed ranges of interest at the same time, when the difference exceeds the threshold in all the speed ranges of interest, it may be determined that damage prediction exists in the site. It will be understood that, in this case, if the difference is below the threshold in any one of the multiple set speed ranges of interest, the abnormality diagnosis apparatus 10 determines that no damage prediction exists in the site.

With the abnormality diagnosis system according to the above-described example, the process of setting the speed range of interest by the speed range of interest setting section 13 can be omitted. This makes it possible to speed up the start date for diagnosis as compared with the configuration according to Example 1.

REFERENCE SIGNS LIST

100 . . . Abnormality diagnosis system
1 . . . Rotary electric machine
2 . . . Main shaft
3 . . . Bearing
4 . . . Vibration sensor
5 . . . Speed sensor
6 . . . Coupling
7 . . . Rotary equipment
10 . . . Abnormality diagnosis apparatus
11 . . . Timer
12 . . . Database
13 . . . Interesting speed range setting section
14 . . . Abnormality determination section
20 . . . Controller
30 . . . Notification apparatus

The invention claimed is:

1. An abnormality diagnosis system, comprising:
a rotary electric machine that has a main shaft secured to a center of a rotor and supported by a bearing;
a vibration sensor that measures a vibration value of the bearing;
a speed sensor that measures a rotational speed value of the main shaft; and
an abnormality diagnosis apparatus that diagnoses abnormality in the rotary electric machine based on the vibration value and the rotational speed value,
wherein the abnormality diagnosis apparatus includes
a database that records the vibration value, the rotational speed value, and measurement times of the vibration value and the rotational speed value, as a data group of one unit, the vibration value and the rotational speed value measured within a predetermined time period, and
an abnormality determination section that makes determination of abnormality, if a first threshold is exceeded by a difference in maximum vibration value in one speed range of interest between a past data group and a newer data group of a plurality of data groups recorded in the database, and makes no determination of abnormality even if the first threshold is exceeded by a difference in maximum vibration value outside the speed range of interest.

2. The abnormality diagnosis system according to claim 1, wherein the abnormality diagnosis apparatus further includes a speed range of interest setting section that sets the speed range of interest, and
the speed range of interest setting section sets, as the speed range of interest, a range around a rotational speed at which a second threshold is exceeded by a difference in maximum vibration value between a past data group and a newer data group of a plurality of data groups recorded in the database.

3. The abnormality diagnosis system according to claim 1, wherein the speed range of interest is preset in accordance with characteristics of the rotary electric machine by an administrator.

4. The abnormality diagnosis system according to claim 1, wherein the speed range of interest is set in plurality.

5. The abnormality diagnosis system according to claim 4, wherein when the first threshold is exceeded by the difference in any range of the plurality of speed ranges of interest set, the abnormality determination section makes determination of abnormality.

6. The abnormality diagnosis system according to claim 5, wherein the abnormality determination section identifies an abnormal site in the rotary electric machine in accordance with a speed range of interest in which the difference exceeds the first threshold.

7. The abnormality diagnosis system according to claim 4, wherein when the first threshold is exceeded by the difference in all ranges of the plurality of set speed ranges of interest, the abnormality determination section makes determination of abnormality.

8. The abnormality diagnosis system according to claim 1, further comprising a notification apparatus having a monitor or a speaker, wherein when the abnormality determination section makes determination of abnormality, the notification apparatus visually or audibly notifies of occurrence of abnormality.

9. The abnormality diagnosis system according to claim 1, further comprising a controller that controls driving of the rotary electric machine, wherein when the abnormality determination section makes determination of abnormality, the controller stops the rotary electric machine or places a restriction on the rotational speed.

\* \* \* \* \*